No. 852,707. PATENTED MAY 7, 1907.
D. M. DEARING.
MOTOR VEHICLE.
APPLICATION FILED JULY 16, 1906.
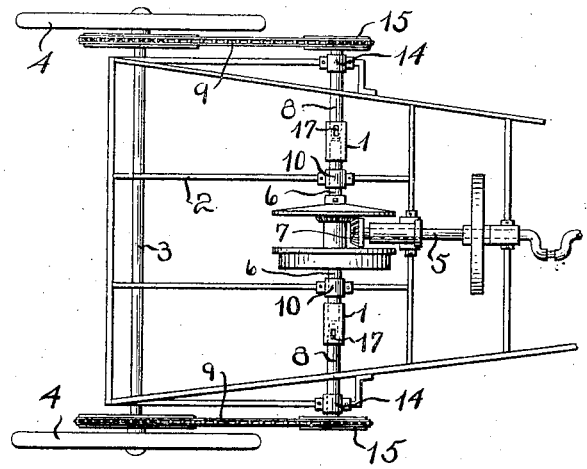
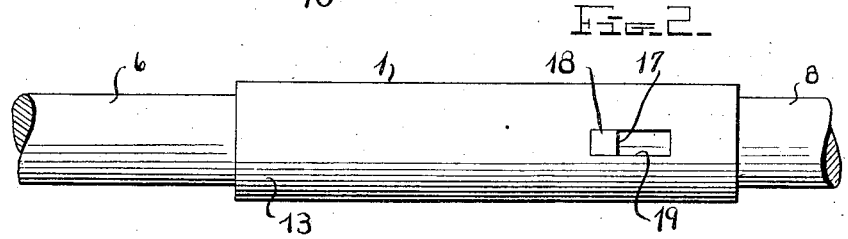
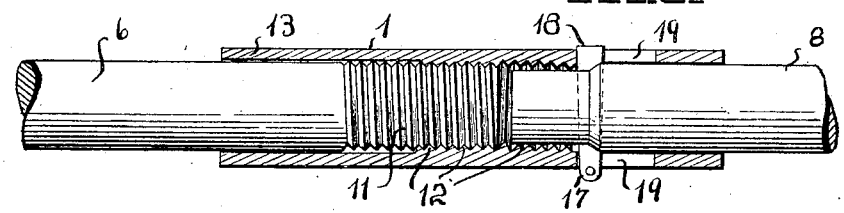
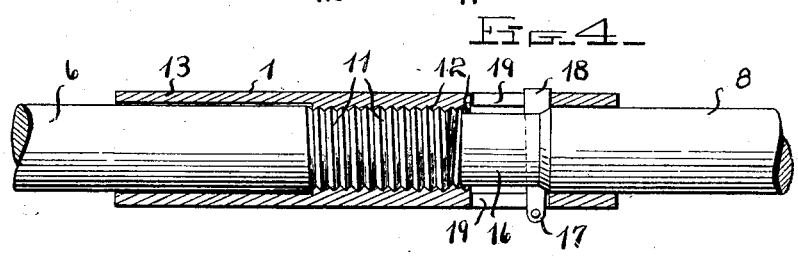
Witnesses
L. B. James
C. H. Griesbauer
Inventor
D. M. Dearing
by H. B. Willson & Co.
Attorneys

UNITED STATES PATENT OFFICE.

DAVID M. DEARING, OF JACKSON, MICHIGAN.

MOTOR-VEHICLE.

No. 852,707.     Specification of Letters Patent.     Patented May 7, 1907.

Application filed July 16, 1906. Serial No. 326,491.

*To all whom it may concern:*

Be it known that I, DAVID M. DEARING, a citizen of the United States, residing at Jackson, in the county of Jackson and State of Michigan, have invented certain new and useful Improvements in Motor-Vehicles; and I do declare the following to be a full, clear, and exact description of the invention, such as will enable others skilled in the art to which it appertains to make and use the same.

My invention relates to improvements in equalizing devices for the drive wheels of automobiles and other motor vehicles, whereby one of the wheels is permitted to rotate faster than the other in turning a corner or rounding a curve.

The object of the invention is to provide a device of this character, which will be of simple, strong, durable and comparatively inexpensive construction, and very efficient for the purpose intended.

With the above and other objects in view, the invention consists of certain novel features of construction, combination and arrangement of devices, hereinafter described and claimed.

In the accompanying drawings,—Figure 1 is a plan view of the rear portion of an automobile, showing the application of my improved equalizing device thereto; Fig. 2 is a top plan view of the device on an enlarged scale; Fig. 3 is a longitudinal sectional view through the same, showing the parts in their normal position; and Fig. 4 is a similar sectional view, showing the position of the parts adjacent to the outer wheel when the automobile is turning a corner.

Referring to the drawings, 1 denotes my improved equalizing device, which may be mounted between the driving and driven shafts or journals of a motor vehicle or the like of any description, but which, as here shown, is a light-weight automobile comprising a frame 2, a rear axle 3, supporting and drive wheels 4 upon the latter, a motor shaft 5, a variable-speed driving shaft 6, variable-speed gearing 7, between the latter and the motor shaft, driven shafts 8, which are connected by my improved equalizing devices 1 to the ends of the drive shaft 6, and driving gearing or connections 9, between the outer ends of the driven shafts 8 and the wheels 4.

The main shaft or journal 6, which may be driven, as shown or in any other suitable manner, is mounted in suitable bearings 10, and has at its ends screw-threads 11. The latter are adapted to work in similar screw-threads 12 formed interiorly in the central portion of sleeves 13, which telescope the adjacent ends of the shafts 6, 8.

The driven shafts or journals 8 are mounted in longitudinal alinement with the shaft 6 in suitable bearings 14, which prevent them from moving endwise. The outer ends of the shafts 8 carry sprockets 15 or other power-transmission elements of the driving connections 9, and their inner ends are slightly reduced, as shown at 16, and carry transverse keys 17, the ends 18 of which project through and slide in longitudinally-disposed slots 19, formed at diametrically opposite points in the outer ends of the sleeves 13.

Instead of employing the cross-pin or key 17, studs or any other suitable devices may be provided upon the shafts 8 to limit the sliding movement of the sleeves 13 thereon.

The operation of the invention is as follows: When the machine is moving forwardly in a straight line, the parts of the equalizing devices will assume the position shown in Figs. 2 and 3, in which it will be noted that the sleeve 13 is turned out upon the end of the screw-threaded portion 11 of the driving shaft 6, so that the key 17 is engaged with the inner ends of the slots 19 in the sleeve, so that these parts will be wedged together and thus caused to rotate together. In rounding a curve or turning a corner, the outer drive wheel will rotate faster than the inner one, which latter does the driving, and when the outer wheel rotates faster than the inner one, the adjacent sleeve 13 will screw or turn inwardly upon the threaded end 11 of the shaft 6, so that the key 17 will move toward the outer ends of the slots 19, the extent of movement depending upon the size of the curve or arc described by the machine. When the machine again moves forwardly in a straight line, the shaft 6 will again rotate faster than the shaft 8, and the sleeve will again turn or screw outwardly until the key engages the inner ends of the slots and locks the parts together as previously stated. It will be seen that the device is of exceptionally simple construction, so that it may be manufactured at a comparatively small cost, and that it works automatically in a most efficient manner.

While I have shown and described the preferred embodiment of my invention, it will be understood that I do not wish to be limited to the precise construction set forth, since various changes in the form, proportion and the minor details of construction may be resorted to without departing from the principle or sacrificing any of the advantages of this invention, as defined by the appended claims.

Having thus described my invention, what I claim as new, and desire to secure by Letters-Patent, is,—

1. The combination with driving and driven shafts arranged in longitudnal alinement, of an element slidably but non-rotatably mounted upon one of said shafts and having a screw-threaded engagement with the other.

2. The combination with driving and driven shafts arranged in longitudinal alinement and one having external screw-threads at its end, of a sleeve telescoping the ends of said shafts and having internal screw-threads to engage the threads upon one of said shafts, said sleeve being slidably but non-rotatably mounted upon the other of said shafts.

3. The combination with driving and driven shafts arranged in longitudinal alinement and one having external screw-threads at its end, of a sleeve telescoping the ends of said shafts and having internal screw-threads to engage the threads upon one of said shafts and longitudinal slots, and a stud or projection upon the other of said shafts disposed in said slot to cause the sleeve to rotate with said shaft and permit it to slide thereon.

4. The combination with a drive shaft having a screw-threaded end and a driven shaft disposed in longitudinal alinement with the drive shaft and formed with a transverse opening, of a sleeve telescoping the ends of said shafts and formed with internal screw-threads to engage the threads of the drive shaft and with oppositely-disposed, longitudinally-extending slots, and a key extending through said slots and the opening in said driven shaft, substantially as described, and for the purpose set forth.

5. The combination with a drive shaft having screw-threads at its ends and driven shafts disposed in longitudinal alinement with the drive shaft, of elements slidably but non-rotatably mounted upon said driven shafts and engaged with the screw-threads on said drive shaft, for the purpose set forth.

6. The combination with a drive shaft having screw-threaded ends and driven shafts disposed in longitudinal alinement with the drive shaft, of sleeves telescoping the adjacent ends of said shafts and having internal screw-threads to engage the threads upon said drive shaft and longitudinal slots, and projections upon said driven shafts to engage the slots in said sleeves, for the purpose set forth.

In testimony whereof I have hereunto set my hand in presence of two subscribing witnesses.

DAVID M. DEARING.

Witnesses:
JOHN McDEVITT,
ANNA McDEVITT.